United States Patent
Naziri et al.

(10) Patent No.: US 12,504,751 B2
(45) Date of Patent: Dec. 23, 2025

(54) INSPECTION SYSTEM AND METHOD

(71) Applicant: Transportation IP Holdings, LLC, Norwalk, CT (US)

(72) Inventors: Mohd Fahad Naziri, Bengaluru (IN); Barry Allen Record, Grove City, PA (US); Matthew Joseph Heid, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/578,594

(22) Filed: Jan. 19, 2022

(65) Prior Publication Data

US 2023/0229155 A1    Jul. 20, 2023

(51) Int. Cl.
*G05B 23/02* (2006.01)
*G06Q 10/0631* (2023.01)
*G06Q 10/20* (2023.01)
*H04L 67/12* (2022.01)

(52) U.S. Cl.
CPC ... *G05B 23/0283* (2013.01); *G06Q 10/06311* (2013.01); *G06Q 10/20* (2013.01); *H04L 67/12* (2013.01)

(58) Field of Classification Search
CPC ......... G05B 23/0283; G06Q 10/06311; G06Q 10/20
See application file for complete search history.

(56) References Cited

U.S. PATENT DOCUMENTS

| | | | |
|---|---|---|---|
| 11,049,060 B2 * | 6/2021 | Wang | H04L 67/12 |
| 2009/0256077 A1 * | 10/2009 | Brady | G01J 5/0088 |
| | | | 250/330 |
| 2015/0185111 A1 | 7/2015 | Armstrong et al. | |

(Continued)

FOREIGN PATENT DOCUMENTS

| | | |
|---|---|---|
| CN | 109145773 B | 10/2021 |
| JP | 2012233336 A | 11/2012 |

(Continued)

OTHER PUBLICATIONS

Extended European Search Report for correspondiong EP Application No. 22215994.9 dated Jun. 16, 2023 (8 pages).
Denkena et al. "Condition based maintenance planning of highly productive machine tools" Prod. Eng. Res. Devel. (2012) 6:277-285 (9 pages).
Office Action for corresponding JP Application No. 2022207540 dated Jan. 31, 2024 (14 pages).

*Primary Examiner* — Lee E Rodak
*Assistant Examiner* — Sangkyung Lee
(74) *Attorney, Agent, or Firm* — K&L Gates LLP

(57) ABSTRACT

An inspection system and method of operation may include receiving sensor data for a component of a powered system, and determining an expected failure time of the component at which the component is expected to fail based at least in part on the sensor data. The expected failure time occurring on a timeline. A window start time may be determined on the timeline that is after a current time but is prior to the expected failure time. The window start time and the expected failure time may define a window time range that extends between the window start time and the expected failure time on the timeline. One or both of a repair action or a maintenance action of the powered system may be scheduled at a scheduled time occurring during the window time range and at a time prior to the expected failure time on the timeline.

22 Claims, 6 Drawing Sheets

(56) References Cited

U.S. PATENT DOCUMENTS

| | | | |
|---|---|---|---|
| 2016/0146709 A1* | 5/2016 | Dey | G05B 23/0229 |
| | | | 702/183 |
| 2016/0147204 A1* | 5/2016 | Wichmann | G05F 1/66 |
| | | | 700/287 |
| 2017/0169143 A1* | 6/2017 | Farahat | G06F 17/18 |
| 2017/0309094 A1* | 10/2017 | Farahat | G07C 5/0841 |
| 2018/0129195 A1* | 5/2018 | Lee | G06Q 10/20 |
| 2018/0245801 A1 | 8/2018 | Schindler et al. | |
| 2018/0336647 A1* | 11/2018 | Nakayama | H02J 3/381 |
| 2020/0142390 A1* | 5/2020 | Hubauer | H04Q 9/00 |
| 2021/0288493 A1* | 9/2021 | Prasad | H02J 3/003 |
| 2021/0335059 A1* | 10/2021 | Dixit | G05B 23/0254 |

FOREIGN PATENT DOCUMENTS

| | | |
|---|---|---|
| JP | 2015525956 A | 9/2015 |
| JP | 2018109951 A | 7/2018 |
| JP | 2018142256 A | 9/2018 |
| JP | 2019153291 A | 9/2019 |
| WO | 2018186956 A1 | 10/2018 |
| WO | WO-2021102571 A1 * 6/2021 ............. E21B 21/08 |

* cited by examiner

INSPECTION SYSTEM AND METHOD

BACKGROUND

Technical Field

The subject matter described herein relates to inspection systems and methods.

Discussion of Art

Inspection systems may be used to determine conditions of another system. These conditions can be determined based on sensor data associated with the other systems. The inspection systems may monitor the sensor data of the other system to determine when the other system requires maintenance and/or repair. For example, an inspection system may monitor instantaneous engine parameters, and may determine whether the sensor data indicates that the engine parameters are in violation of threshold conditions. If the inspection system determines that the engine parameters are in violation of threshold conditions, the inspection system may trigger a repair or maintenance event to repair the engine system. For example, the inspection system may determine that the engine system requires maintenance or repair when the inspection system identifies that the parameters indicate failure of the engine system.

Thus, a need may exist for an inspection system and method that provides advanced notification of whether another system will fail or not, and if it will fail, a tentative time in the future at which failure is expected to occur, which is different than existing systems and methods.

BRIEF DESCRIPTION

In accordance with one embodiment or aspect, a method may include receiving sensor data for a component of a powered system, and determining an expected failure time of the component at which the component is expected to fail based at least in part on the sensor data. The expected failure time occurring on a timeline. A window start time may be determined on the timeline that is after a current time but is prior to the expected failure time. The window start time and the expected failure time may define a window time range that extends between the window start time and the expected failure time on the timeline. One or both of a repair action or a maintenance action of the powered system may be scheduled at a scheduled time occurring during the window time range and at a time prior to the expected failure time on the timeline.

In accordance with one embodiment or aspect, an inspection system may include a controller including one or more processors that may receive sensor data for a component of a powered system. The processors may determine an expected failure time of the component at which the component is expected to fail based at least in part on the sensor data. The expected failure time may occur on a timeline. The controller may determine a window start time on the timeline that is after a current time but is prior to the expected failure time. The window start time and the expected failure time may define a window time range that extends between the window start time and the expected failure time. The controller may schedule one or more of a repair action or a maintenance action of the powered system at a scheduled time occurring during the window time range and prior to the expected failure time on the timeline.

In accordance with one embodiment or aspect, a method may include determining an expected failure time on a timeline at which a powered system is expected to fail based at least in part on sensor data of the powered system. The sensor data may be obtained at a window start time of the timeline. The expected failure time may occur subsequently to the window start time. The expected failure time and the window start time defining a window time range of the timeline. One or more of a repair action or a maintenance action of the powered system may be scheduled at a scheduled repair time at a time on the timeline within the window time range. The scheduled repair time may be based on one or more of one or more operating conditions of the powered system, environmental conditions of the powered system, or one or more operational requirements of the powered system.

BRIEF DESCRIPTION OF THE DRAWINGS

The inventive subject matter may be understood from reading the following description of non-limiting embodiments, with reference to the attached drawings, wherein below:

FIG. 6 illustrates one example of a timeline for scheduling repair or maintenance of a powered system in accordance with one embodiment.

DETAILED DESCRIPTION

Figure 1:
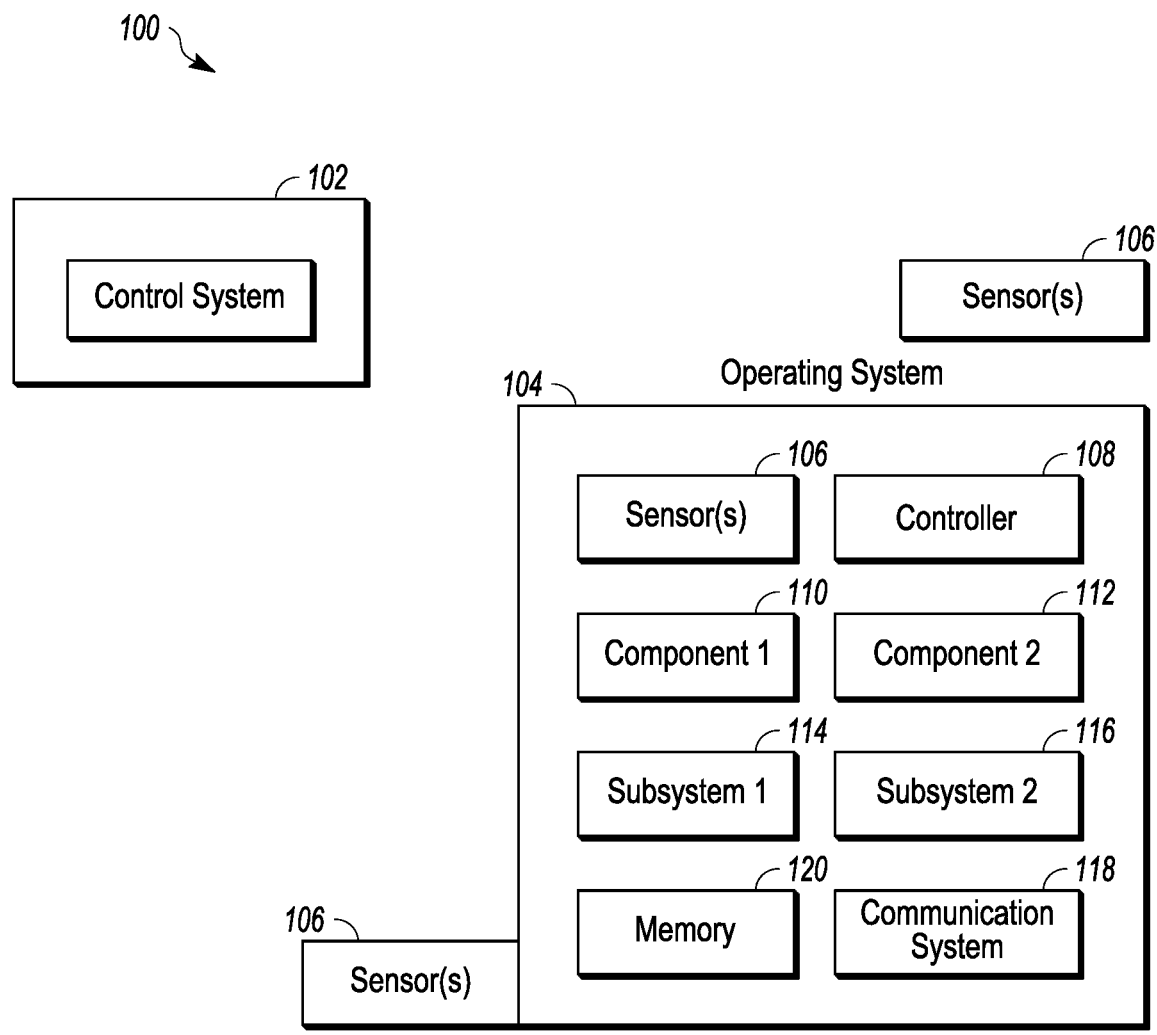
FIG. 1 illustrates one example of an inspection system in accordance with one embodiment.

Embodiments of the subject matter described herein relate to an inspection system and method of operation. The inspection system may include a powered system and control system configured to monitor or inspect conditions of the powered system. In one embodiment, the control system may receive sensor data from one or more sensors coupled with or disposed proximate to the powered system. The sensor data may be associated with the powered system, with one or more different components of the powered system, with an environment to which the powered system is exposed, operating conditions of the powered system, or the like.

The inspection system may determine an expected failure time of one or more components of the powered system based at least in part on the sensor data. The expected failure time may be a time on a timeline at which the component is expected to fail, to require repair, to require maintenance, or the like. The expected failure time may be determined at a window start time on the timeline. The window start time and the expected failure time may define a window time range that extends between the window start time and the expected failure time. The window time range may extend a length of time of about 30 days, of about 60 days, of about 120 days, of about 240 days, or the like. For example, the control system may determine that the powered system is expected to fail about 240 days before the expected failure occurs.

The inspection system may schedule a repair and/or maintenance action of the powered system at a scheduled time within the window time range. For example, the scheduled time of repair and/or maintenance (e.g., a scheduled repair time) may occur on the timeline prior to the expected failure time and after the window start time. For example, the control system may schedule repair and/or maintenance of the powered system at a time ahead of the expected failure time based on the determined expected failure time of the powered system. In one or more embodiments, the inspection system may determine plural different expected failure times for plural different components of the powered system. The control system of the inspection system may schedule the repair and/or maintenance of one or more of the plural different components at the scheduled time based on an earliest expected failure time.

In one embodiment, the powered system may be a system of a vehicle system, such as a fluid system, a thermal system, a mechanical system, an electrical system, a propulsion system, or the like, of the vehicle system. The vehicle system may be a rail vehicle, an automobile, a truck (with or without a trailer), a bus, a marine vessel, an aircraft, a mining vehicle, an agricultural vehicle, or other off-highway vehicle. Optionally, the powered system may be a system of a stationary or other non-vehicle system. For example, the powered system may be a stationary mechanical system, such as a mechanical system used in industrial applications, wherein hot fluid is cooled using a cold stream. The vehicle systems described herein (rail vehicle systems or other vehicle systems that do not travel on rails or tracks) can be formed from a single vehicle or multiple vehicles, and optionally the powered system may extend between two or more of the multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

FIG. 1 illustrates one example of an inspection system 100 in accordance with one embodiment. The inspection system includes an powered system 104 and a control system 102 that may be communicably coupled with the powered system. For example, the control system may remotely control one or more operations of the powered system, such as changing a power setting to power the powered system on and/or off, change a setting of a subsystem of the powered system that may change a performance of the powered system, or the like. In one embodiment, the powered system may be an powered system of a vehicle system, an powered system of a non-vehicle and/or a stationary mechanical system, an powered system of a power-generating system (mobile or stationary), or the like. As one example, the powered system may be an exhaust gas recirculation (EGR) system, a combustion control system, an emission-generating control system, or the like. As another example, the powered system may be a thermal management system, a fluid management system, or the like.

The powered system may include one or more components 110, 112, and/or one or more subsystems 114, 116. One or more of the subsystems may include subsystem components. The components and/or subsystems may include fluid components or systems, thermal components or systems, mechanical components or systems, power-generating components or systems, or the like. For example, the components and subsystems, and/or components of the subsystems, may include engines, motors, alternators, generators, valves, conduits, manifolds, compressors, expanders, fans, blowers, pumps, heat exchangers, coolers, radiators, electrical components, or the like. Optionally, the components or subsystems may be and/or include static components and/or dynamic components. In one or more embodiments, one or more of the components and/or subsystems may be and/or include electrically controlled components, manually controlled components, or the like.

In one or more embodiments, the powered system may include a controller 108 disposed within a body of the powered system (e.g., within a housing of the powered system, coupled with the housing of the powered system, positioned proximate to but outside of the housing, or the like). The controller may represent a control module that can include one or more processors, microcontrollers, or other logic-based devices and/or associated software or instructions, for carrying out one or more operations of the powered system.

In one or more embodiments, the powered system may include a memory 120 or other data storage device. The memory may store or contain data associated with the powered system such as, but not limited to, operating conditions, operating settings, an age of the powered system and/or an age of the components and/or subsystems, types or models of each of the different components and subsystems, historical maintenance and/or repair conducted to the powered system or one or more of the components and/or subsystems, or the like. In one or more embodiments, the powered system may include a communication system 118. The communication system may represent transceiving circuitry, one or more antennas, modems, or the like, that may be setup for one or both of wired or wireless communication. The communication system may communication with components and/or subsystems of the powered system, may communicate with the controller, with the control system, with cloud storage devices or systems, with other controllers separated from the powered system, or the like. Optionally, the powered system may be an powered system that may be devoid or without one or more of the controller, the memory, or the communication system. For example, the powered system may be a mechanical system of a vehicle (e.g., a propulsion system, brake system, or the like), and may be operably coupled with a controller, a memory, and/or a communication system of the vehicle, in which the controller, the memory, and the communication system may be used by other systems of the vehicle system (e.g., are not dedicated solely to the mechanical system).

In one or more embodiments, the inspection system may include one or more sensors 106 disposed within, proximate to, coupled with, or the like, the powered system. The sensors may detect and obtain sensor data associated with the powered system, with one or more components or subsystems of the powered system, with environmental conditions associated with the environment in which the powered system is disposed, or the like. In one or more embodiments, one or more of the sensors may be thermal sensors that detect or sense thermal characteristics of the one or more components, the subsystems, of fluids moving or disposed within the powered system, or the like. Optionally, one or more of the sensors may be an optical sensor such as a camera that may capture stilled and/or video image data of the components and/or subsystems. Optionally, one or more of the sensors may be pressure sensors that may detect a pressure of fluids moving or disposed within the powered system. Optionally, one or more of the sensors may be accelerometers or other speed detection sensors that may detect movement, speeds, or the like, of dynamic components and/or subsystems, of fluids (e.g., gas, liquids, gas-and-liquid mixtures) moving within the operation system, of solids (e.g., debris, particles, or the like) moving within the powered system, or the like. Optionally, one or more of the sensors may be proximity sensors, IR sensors, ultrasonic sensors, current sensors, radio sensors, or the like.

Figure 2:
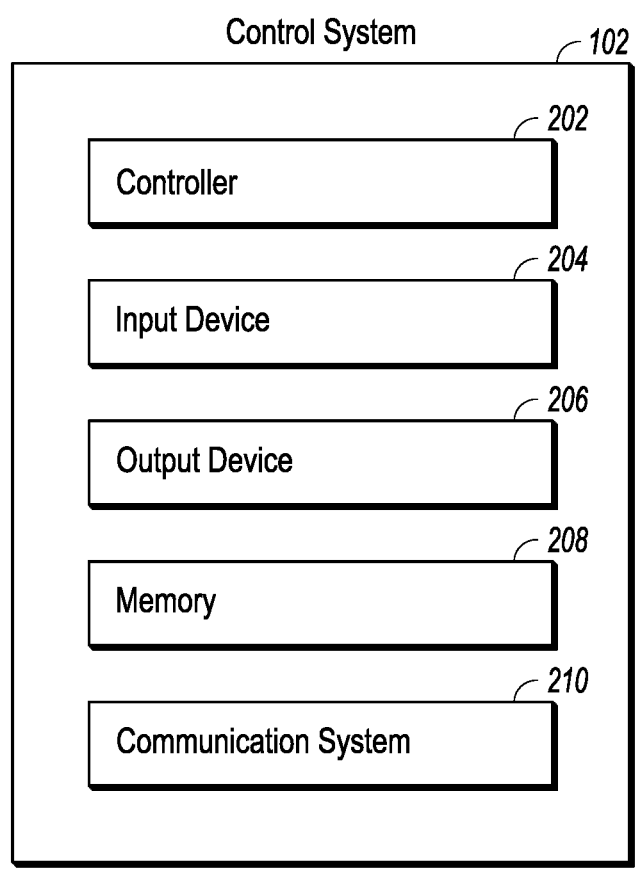
FIG. 2 illustrates a schematic of one example of a control system of the inspection system shown in FIG. 1.

FIG. 2 illustrates a schematic of one example of the control system shown in FIG. 1. The control system may include a controller 202 that may represent and/or that can include one or more processors, microcontrollers, or other logic-based devices and/or associated software or instructions, for carrying out one or more operations described herein.

The control system may be manually operated by receiving instruction signals from an input device 204 e.g., a device that receives input from an operator such as, but not limited to, a touchscreen, a joystick, a keyboard, a switch, a wheel, a microphone, or the like) based on manual input from an operator at the input device. An output device 206 can provide information to the operator, such as sensor data received from the sensors (e.g., sensor data associated with the powered system, sensor data associated with an environment in which the powered system is operating, or the like), information associated with the powered system (e.g., operating conditions and/or settings, type and/or classification of the components and/or subsystems, age and/or amount of use of the powered system, health status of the components and/or subsystems, or the like), or the like. The control system may include a memory 208 or other data storage device. In one embodiment, the memory may store or contain the sensor data and other information associated with the powered system, information associated with other powered systems, or the like. Optionally, the control system may be communicably coupled with other storage databases (e.g., other memory devices of other systems, data storage cloud systems, or the like) that may store and/or contain data associated with the powered system, data associated with other powered systems, or the like.

The control system may include a communication system 210 that may be setup for one or both of wired or wireless communication. For example, the communication system can represent transceiving circuitry, one or more antennas, modems, communication cables, or the like. The communication system may communicate (e.g., receive and/or provide data signals) with the communication system of the powered system, or the like. In one embodiment, the communication system can interact with the powered system and/or other systems via one or more communication types. Suitable communication types can include, but are not limited to, cellular networks (e.g., the Global System for Mobile Communications (GSM)), mesh networks using Ethernet standards, wireless communication protocols (e.g., Bluetooth), radio and shortwave communication types, or the like. In one or more embodiments, where two or more communication types are present, the communication system may translate some or all of a data stream from one type to another. Similarly, different data protocols may be used. Such translation may allow the communication system to act as a transference point for data transmission. The translation may allow for different types of equipment (e.g., first and second vehicle systems may each use communication types different from each other to communicate with each other via the communication system). The communication system may switch types, protocols, and/or communication pathways in response to delegation of signal or failure of one pathway. This may provide redundancy of communication by the communication system. In one embodiment, the communication system may decrypt, decompile, or disaggregate information, parse information, and send along all or part of a message (e.g., alone or combined with new data, or with encryption, or both). The communication system may be the same as or similar to other communication devices or communication systems described herein.

In one or more embodiments, the control system may represent a back-office server or a dispatch center, such as of a positive vehicle control (PVC) system. A PVC system is a control system in which a vehicle is allowed to move, and/or is allowed to move outside a designated restricted manner (such as above a designated penalty speed limit), only responsive to receipt or continued receipt of one or more signals (e.g., received from off-board the vehicle system) that meet designated criteria, the signals have designated characteristics (e.g., a designated waveform and/or content) and/or are received at designated times (or according to other designated time criteria) and/or under designated conditions. This is opposed to 'negative' vehicle control systems where a vehicle system is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board control system represents another computerized system that communicates with vehicles and/or non-vehicle systems described herein.

Figure 3:
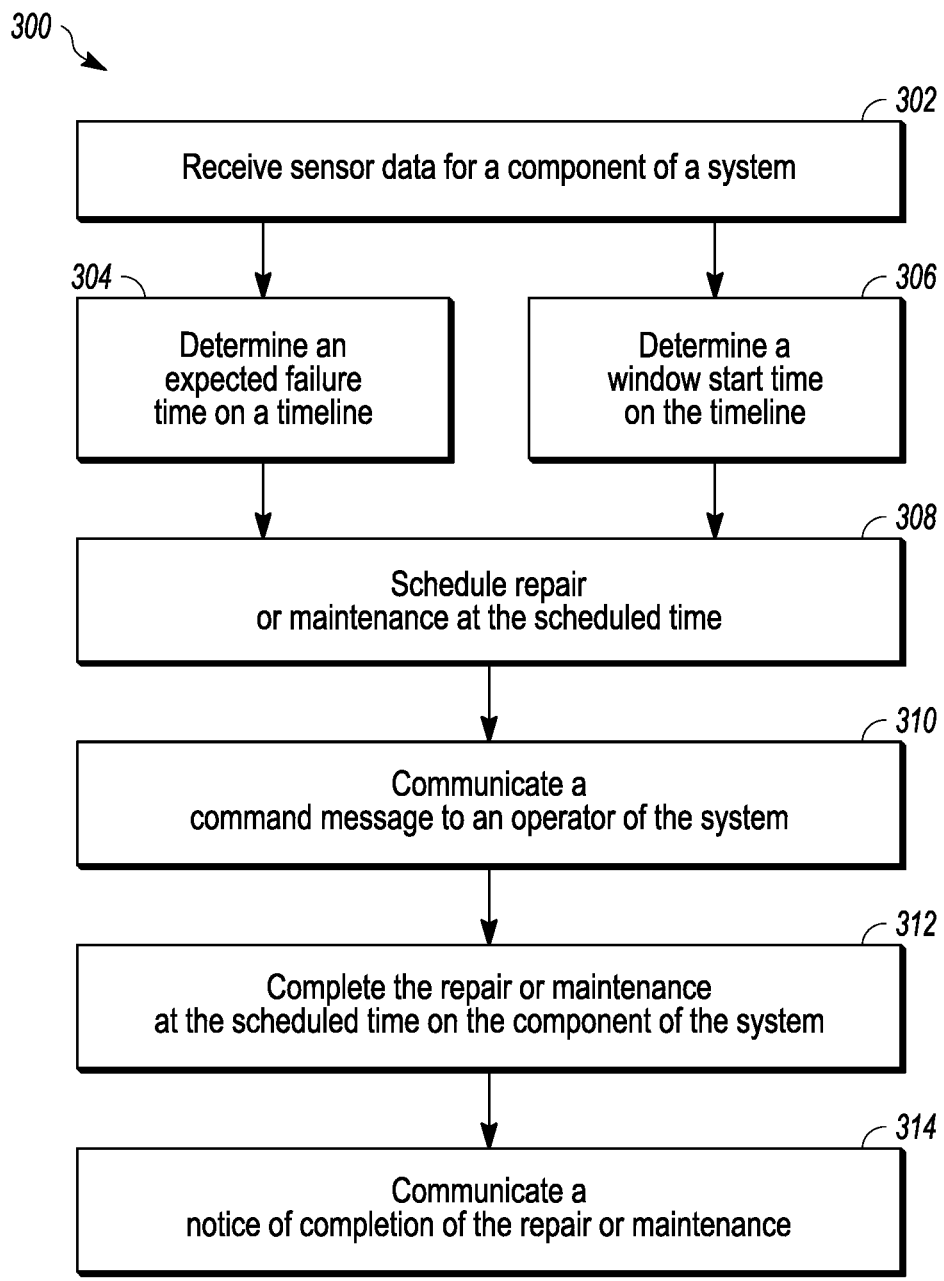
FIG. 3 illustrates a flowchart of one example of a method of determining a repair or maintenance schedule of a powered system in accordance with one embodiment.
Figure 4:
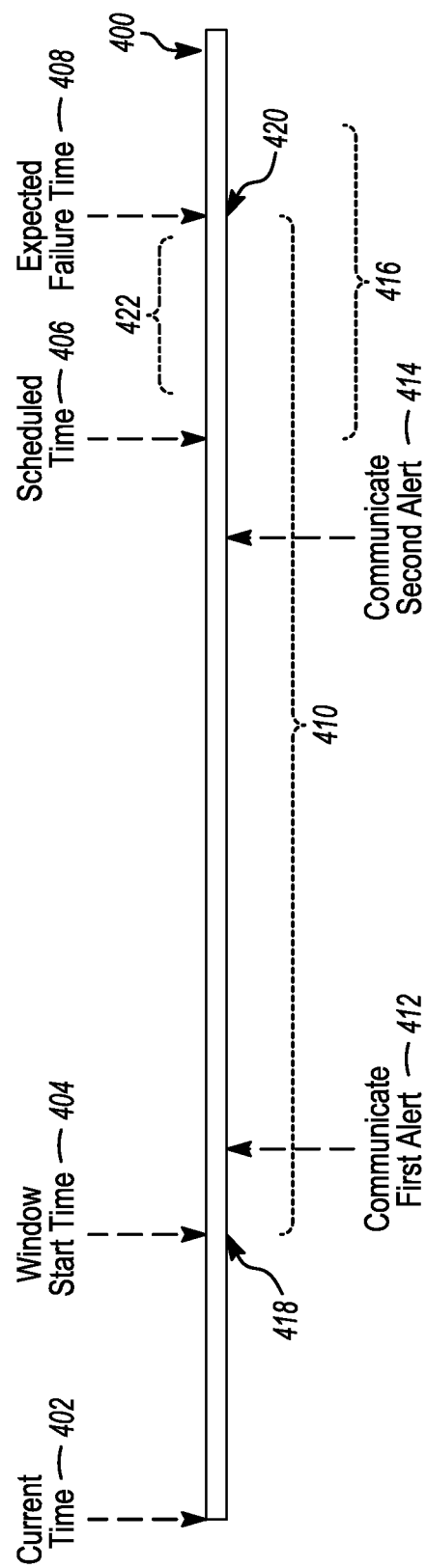
FIG. 4 illustrates one example of a timeline of scheduling repair or maintenance of a powered system in accordance with one embodiment.

FIG. 3 illustrates one example of a flowchart 300 of a method of determining a repair or maintenance schedule of an powered system in accordance with one embodiment. One or more of the steps illustrated in the flowchart shown in FIG. 3 may be omitted and/or completed in an alternative order. Optionally, the method may include additional and/or alternative steps in order to determine the repair and/or maintenance schedule of the powered system. Additionally, FIG. 4 illustrates one example of a timeline 400 of scheduling repair or maintenance of an powered system in accordance with one embodiment. FIGS. 3 and 4 will be discussed together herein.

At step 302, sensor data obtained by one or more sensors coupled with or positioned proximate to the powered system may be received at the control system, the controller of the powered system, or the like. The sensor data may be communicated with the control system via the communication system of the powered system, or optionally the sensors may communicate the sensor data with the control system directly. The sensor data may be received at scheduled intervals of time (e.g., every 30 seconds, every 60 seconds, every 60 minutes, every 24 hours, every seven days, or the like). Optionally, the sensor data may be received responsive to the sensed data exceeding a threshold value, falling outside of a threshold range, the sensed data changing by a threshold percentage (e.g., within a predetermined window of time), or the like. Optionally, the sensor data may be received responsive to a request from the control system for the sensed data.

In one or more embodiments, the sensors (e.g., illustrated in FIG. 1) may detect or otherwise sense data associated with the powered system. The sensor data may be associated with one or more of the components of the powered system, one or more of the subsystems of the powered system, one or more components of the subsystems, or the like.

At step 304, the control system may determine an expected failure time 408 (shown in FIG. 4) of one or more of the components, and/or one or more of the subsystems, at which the powered system is expected to fail based at least in part on the sensor data. Additionally, at step 306, a window start time 404 (shown in FIG. 4) may be determined. The window start time may be at a time on the timeline that is after the current time but prior to the expected failure time. Optionally, the window start time may be at a time that is about the current time.

In one or more embodiments, the expected failure time may be determined based on historical data associated with the components and/or subsystems of the powered system, based on a type, modality, classification, or the like, of the components of the operation system, based on historical usage data of the powered system (e.g., a length of time in which the system has been operated), environmental conditions to which the powered system has been exposed and/or operated, or the like.

In one or more embodiments, the expected failure time may be determined by the control system examining and/or manipulating the sensor data (e.g., with additional characteristics or information of the powered system) according to one or more equations. In one or more embodiments, the powered system may be a thermal system, such as an exhaust gas recirculation (EGR) system, disposed within or coupled with a system. One or more of the sensors may be thermal sensors that may be used to detect thermal characteristics of fluids moving within the EGR system. For example, the sensor data communicated to the control system from the sensors may be thermal sensor data associated with the one or more fluids moving within the EGR system. Equation 1 may be one example of a way for calculating an effectiveness of the EGR system based on the thermal sensor data received by the control system.

$$\eta = \frac{(\text{Hot fluid In}) - (\text{Hot Fluid Out})}{(\text{Hot Fluid In}) - (\text{Cold Fluid In})} \qquad \text{Eq. 1}$$

The effectiveness ($\eta$) may be calculated after the EGR system has been in use or operating for a number of days. For example, the timeline includes the window start time that is after a current time 402 but is prior to the expected failure time. The window start time may be at a time that is about 24 hours after the current time, may be at a time that is about 30 days after the current time, at a time that is about 60 days after the current time, at a time that is about 120 days after the current time, or the like. For example, the window start time may be at a predetermined time that is after the current time in order to allow the powered system to be in use and operating for a length of time before the sensor data may be used to determine the effectiveness of the EGR system.

Responsive to the timeline of the powered system reaching the window start time, the expected failure time for the powered system may be calculated based on the mathematical model illustrated in Equation 2.

$$\eta = \frac{1}{x} + c \qquad \text{Eq. 2}$$

For example, the control system may receive sensor data of the powered system responsive to the powered system operating at or during the window start time. In the Equation 2, the q-value may represent the EGR effectiveness, the x-value may represent the age of the EGR system (e.g., the age of the EGR system at the window start time), and the c-value may represent a constant.

As one example, responsive to determining the effectiveness of the EGR system (e.g., the q-value of Equation 2) at the age of 60 days of use of the EGR system (e.g., the window start time), the constant c-value may be calculated. For example, Equation 3 illustrates one example for determining the constant c-value of Equation 2.

$$c = \eta_{60} - \tfrac{1}{60} \qquad \text{Eq. 3}$$

Responsive to determining the constant c-value of Equation 3 for the EGR system at the $60^{th}$ day of use of the EGR system (e.g., at the window start time), the effectiveness of the EGR system may be calculated (e.g., based on Equation 2) for any future age of the EGR system (e.g., at about 120 days of use, at about 180 days of use, at about 240 days of use, at about 300 days of use, or the like). For example, characteristics of the component at the window start time may be determined based on the sensor data received by the control system, and the characteristics of the component at the window start time may be used to determine the expected failure time of the powered system.

Figure 5:
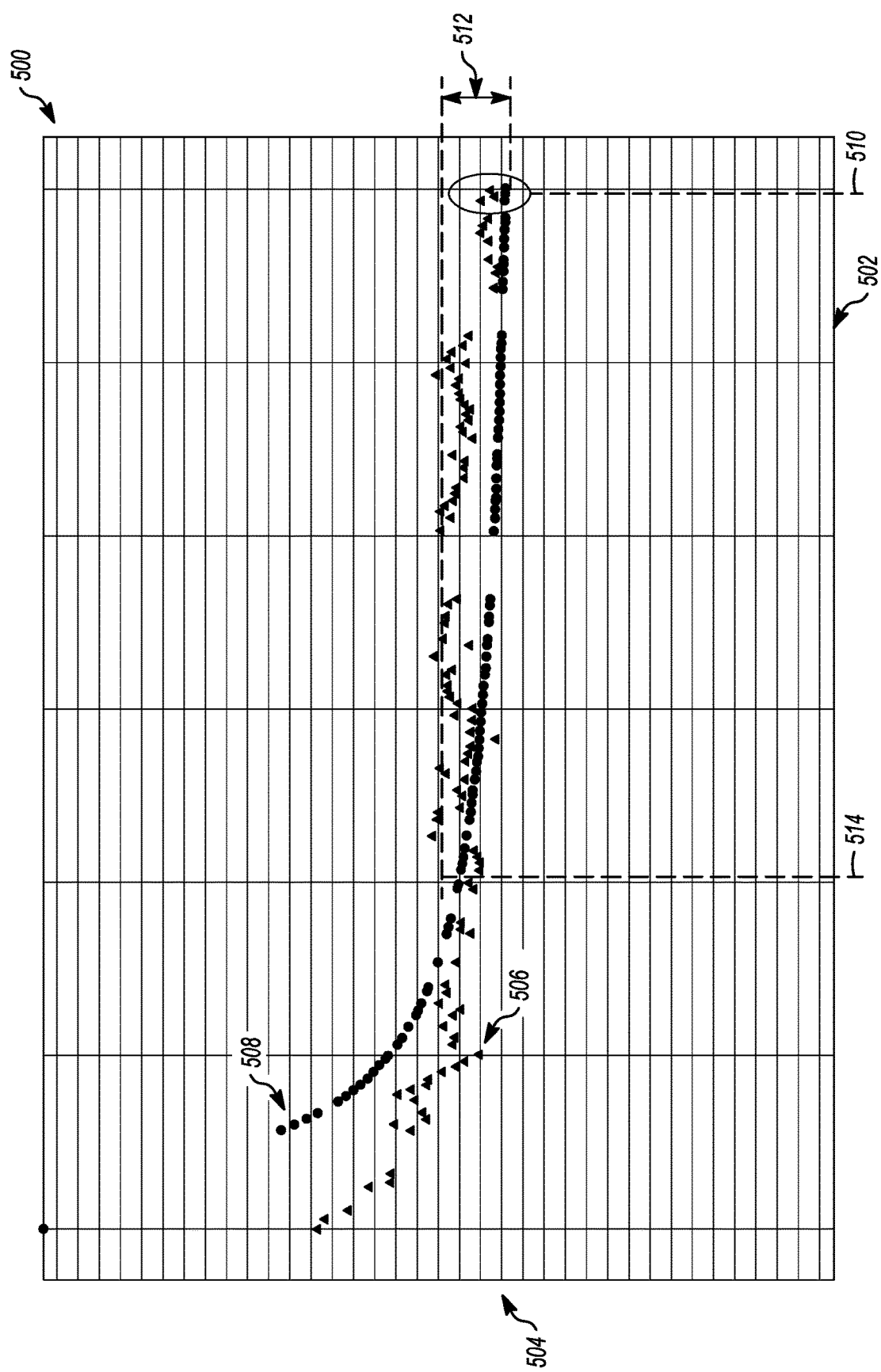
FIG. 5 illustrates a graph for determining an expected failure time of a powered system.

FIG. 5 illustrates one example of a graph 500 illustrating the calculated EGR effectiveness data (e.g., predicted or anticipated EGR effectiveness) compared with actual EGR effectiveness data of the EGR system. The graph includes a horizontal axis 502 representative of time and a vertical axis 504 representative of EGR effectiveness. The graph includes a first distribution of data 506 corresponding to the actual EGR effectiveness data of the EGR system. For example, the first distribution of data may be determined based on the sensor data during a previous operating session of the EGR system.

Additionally, the graph includes a second distribution of data 508 corresponding to the calculated predicted or anticipated effectiveness data of the EGR system. For example, the predicted or anticipated EGR effectiveness data may be calculated according to Equation 2 for plural different times responsive to determining the constant c-value of Equation 3. The graph illustrates that the second distribution of data corresponding to the predicted (e.g., calculated) effectiveness of the EGR system resembles (e.g., within a percentage threshold) the first distribution of data corresponding to the actual EGR effectiveness data of the EGR system.

In one or more embodiments, the expected failure time of the EGR system may be determined based on a determined threshold margin of change 512 of the EGR effectiveness. The threshold margin of change may be determined based on the EGR effectiveness at a first time 514 of the calculated effectiveness of the system. In one or more embodiments, the first time may be referred to as the window start time, shown on the timeline illustrated in FIG. 4. In one embodiment, the window start time may be a predetermined length of time, such as a time that is about 60 days after the current time (e.g., after the powered system has been in use for about 60 days, such as since the last maintenance and/or repair action of the system, since a first time use of the system, or the like). Optionally, the window start time may be based on the EGR effectiveness changing by a second threshold margin from a current time to the window start.

The threshold margin of change may be used to determine the expected failure time at which the component and/or powered system is expected to fail. For example, the expected failure time of the EGR system may be based on the EGR effectiveness calculated data at the first time (e.g., the window start time) changing by the threshold margin of change. In the illustrated embodiment, the expected failure time may be shown at a second time 510. For example, the second time may be determined based on the calculated predicted or anticipated EGR effectiveness data changing by the determined threshold margin of change.

In one or more embodiments, the expected failure time may be a predicted, anticipated, or expected time in the future (e.g., in the next 60 days, in the next 120 days, in the next 240 days, or the like), at which the powered system is expected to fail, to require a repair action, or the like. For example, the expected failure time may indicate a future time at which the powered system may require maintenance.

In one or more embodiments, the maintenance event may be a routine maintenance event (e.g., an expected or anticipated event for maintaining the powered system). Alternatively, the maintenance or repair event may be a non-routine maintenance event (e.g., an unexpected or unanticipated maintenance event). For example, the maintenance event may be to clean one or more components of the powered system. The repair event may be to fix, correct, replace, or otherwise repair a faulty, broken, malfunctioning, or the like, component of the powered system.

In one or more embodiments, the expected failure time may be based on at least one of a level of degradation or a rate of degradation of one or more components or subsystems of the powered system. For example, the sensor data received by the control system from the one or more sensors of the powered system may indicate that one or more components has or will reach a level of degradation at a future time, and the expected failure time may be determined based on the indication of the level of degradation indicated by the sensor data. Optionally, the control system may determine that the rate of degradation of one or more of the components of the powered system is greater than or exceeds an anticipated rate of degradation. The expected failure time may be determined based on the rate of degradation of the one or more components.

In one or more embodiments, the expected failure time may indicate a time on the timeline ahead of or after the powered system may be expected to require maintenance. For example, operating manuals and/or instructions of the one or more components or subsystems, or historical data of the powered system, may indicate a baseline schedule for maintaining the components of the powered system. The expected failure time on the timeline may be different than the baseline schedule for maintaining the powered system. For example, the expected failure time may be at a time on the timeline that is after the baseline schedule for maintaining the powered system, and therefore a maintenance and/or repair event may be delayed from the baseline schedule until the expected failure time. Alternatively, the expected failure time may be at a time on the timeline that is before the baseline schedule for maintaining the powered system, and therefore the maintenance and/or repair event may be scheduled for the expected failure time ahead of the baseline schedule.

In one or more embodiments, the control system may determine a margin of error 416 of the expected failure time. For example, the expected failure time may be determined to be at a time on the timeline that is within a window of the determined margin of error. The margin of error may differ or vary for the different components and/or different subsystems of the powered system. In one embodiment, the margin of error may differ based on operating conditions of the powered system. For example, the powered system may be in use in an environment that may strain or put stresses on the different components that are different than strains or stressed caused by the powered system in use in a different environment. The different environments may have different ambient conditions (e.g., temperature, humidity, pressure, or the like), different geographic regions (e.g., rural versus city), different air quality conditions, or the like. Optionally, the margin of error for different components of the system may vary based on a criticality of the different components. For example, the health and/functionality of the first component may be greater than the health and/or functionality of a second component of the powered system. Optionally, the margin of error may be based on an amount or level of failure of the powered system (or a component of the system) is expected to experience at the anticipated or expected failure time. For example, does the expected failure time indicate a potential for death due to the expected failure of the one or more components, does the expected failure time indicate a potential for a totality of failure of the system, or the like.

Returning to FIG. 3, at step 308, the control system may automatically schedule a repair event and/or a maintenance event of the powered system. The repair and/or maintenance event may be scheduled during a window time range 410 that extends on the timeline between the window start time and the expected failure time. For example, the window time range may indicate a lower limit 418 and an upper limit 420 on the timeline at which the repair and/or maintenance event may be scheduled. In one or more embodiments, the repair and/or maintenance event may be scheduled at a scheduled time 406. The control system may determine the scheduled time and may schedule the repair and/or maintenance action of the component at the scheduled time based on one or more operating conditions of the powered system, environmental conditions of the system, operational requirements of the powered system, or the like.

In one or more embodiments, the scheduled time may be at a time along the timeline that may fall within the window time range. The scheduled time may be separated from the expected failure time by at least the margin of error of the expected failure time. Optionally, the scheduled time may be at a time that is about the time of the expected failure time. Optionally, the scheduled time may be separated from the expected failure time by another predetermined length of time. For example, the scheduled time for the repair and/or maintenance event may be at a time that is about 60 days, about 120 days, about 180 days, about 240 days, or the like, after the window start time. Optionally, the scheduled time may be at a time that is about 1 day, 10 days, 50 days, or the like, prior to the expected failure time.

For example, the scheduled time for the repair and/or maintenance event may be scheduled months in advance in order to schedule the repair and/or maintenance event at a time that is preferable to the powered system. In one or more embodiments, the scheduled time may be determined based on a forecast of usage of the powered system. For example, the powered system may be expected to be in use for at least 180 days after the window start time, but may not have an expected failure time until 220 days after the window start time. The control system may schedule the repair and/or maintenance event to occur after the 180 days at a time when the powered system is expected to no longer be in use, but before the expected failure time. For example, the control system may schedule the maintenance event at a time after the powered system is expected to no longer be in use, in order to prevent the powered system from being taken out of use earlier than necessary. As another example, the repair and/or maintenance event may include exposing the powered system to increased and/or decreased fluid temperatures (e.g., hot fluids or cold fluids for cleaning, or the like). The control system may schedule the maintenance and/or repair event for a time of the year in which the environment (e.g., a weather forecast) may be better suited to exposing the powered system to the increased or decreased fluid temperatures.

As another example, the control system may schedule the maintenance and/or repair event for a time in which a maintenance facility is expected to be available to perform the maintenance and/or repair to the powered system. As another example, the control system may schedule the repair and/or maintenance at a time that is after a baseline schedule for maintaining the components of the powered system. For example, an operating manual or instructions of the components of the powered system may indicate that the components should be maintained after a determined length of time, a determined amount of use, at predetermined intervals of time, or the like. Alternatively, the control system may determine that the powered system may continue to operate past the baseline schedule indicated by the operating manual, and may schedule the scheduled time for a time that is after the baseline schedule, such as a time that is more convenient for the powered system.

At step 310, the control system may communicate a command message to an operator of the powered system. The command message may indicate to the operator the scheduled time for the maintenance and/or repair event. Optionally, the command message may include the expected failure time. Optionally, the command message may include the window time range (e.g., the lower limit and/or the upper limit of the window time range). Optionally, the command message may include instructions to the operator to direct the operator to schedule the maintenance and/or repair event at a time that is prior to the expected failure time on the timeline. Optionally, the command message may include instructions for the operator to manually control the powered system to move the powered system toward a location where the maintenance and/or repair event is to take place.

In one embodiment, the control system may communicate a first alert 412 to the operator of the powered system. Optionally, the control system may communicate a second alert 414 to the operator that is after the first alert but prior to the expected failure time. In one embodiment, the first alert may have a priority level that is less than a priority level of the second alert. For example, the priority level of the one or more alerts may be based on a length of time between the expected failure time and the alert being communicated, based on a length of time between the expected failure time and the scheduled time, or the like. The control system may escalate warning messages to the powered system as the expected failure time of the powered system approaches. For example, the command message may indicate a high priority level responsive to determining that a length of time between the expected failure time and the scheduled time of the timeline is less than a determined time range 422, and the alert may indicate a low priority responsive to determining that the length of time between the expected failure time and the scheduled time is greater than the determined time range. In the illustrated embodiment of FIG. 4, the scheduled time occurs on the timeline prior to the determined time range. The command message to the operator may indicate a low priority level responsive to determining that the length of time between the expected failure time and the scheduled time is greater than the determined time range.

At step 312, the repair and/or maintenance actions may be completed on the components and/or subsystems of the powered system. In one embodiment, the repair and/or maintenance actions may be completed at a maintenance facility, at a current location of the powered system (e.g., the powered system may not need to move to a maintenance facility to have the repair and/or maintenance actions completed), or the like. One or more actions to repair and/or maintain the powered system may be completed manually, automatically, or a combination thereof.

At step 314, a notice or command message may be communicated to the operator of the powered system that the repair and/or maintenance actions have been completed. In one embodiment, the notice may indicate results of the maintenance or repair event, may include revised operating settings for the powered system, may include instructions for the operator of the powered system, or the like. Optionally, the notice of completion of the repair and/or maintenance action, and information related to the tasks completed during the repair or maintenance action, may be stored in the memory of the control system, communicated to an alternative system, or the like.

FIG. 6 illustrates a timeline 600 for scheduling repair or maintenance of a system in accordance with one embodiment. The timeline includes a current time 602 and a window start time 604 that occurs at a time on the timeline that is after the current time. Additionally, the timeline includes a first expected failure time 606 and a second expected failure time 608. The first expected failure time may represent a time on the timeline at which the control system has determined that a first component (e.g., component 110 shown in FIG. 1) is expected to fail based at least in part on the sensor data associated with the first component received from the one or more sensors. The second expected failure time may represent a time on the timeline at which the control system has determined that a second component (e.g., component 112 shown in FIG. 1) is expected to fail based at least in part on sensor data associated with the second component received from the one or more sensors.

In one or more embodiments, the control system may schedule the repair and/or maintenance actions for one or both of the first or second components at a scheduled time 612 based on the first and second expected failure times. As one example, the control system may determine that the first expected failure time occurs before the second expected failure time on the timeline, and that the repair of the first component is required before or prior to the repair of the second component. The control system may schedule the repair and/or maintenance for at least the first component at the scheduled time that occurs before the first expected failure time on the timeline.

In one embodiment, the control system may determine whether the second expected failure of the second component occurs outside of or within a window of repair 610. The window of repair may extend on the timeline between the window start time and a second time 614 on the timeline. One or more components and/or subsystems of the powered system that are determined to have expected failure times that fall within the window of repair may all be repaired and/or maintained before the earliest occurring expected failure time. Alternatively, components and/or subsystems of the powered system that are determined to have expected failure times that fall outside of the window of repair may not be repaired and/or maintained. For example, components with failure times occurring within the determined window of repair may be repaired and/or maintained earlier than necessary, but while the powered system is already being repaired or maintained. Alternatively, the control system may determine that it is too early to complete repair and/or maintenance actions on components with failure times occurring outside of the determined window of repair.

In the illustrated embodiment, the control system may determine that the first expected failure time occurs before the second expected failure time, and that the second expected failure time occurs outside of the window of repair. The control system may schedule the repair and/or maintenance action for the first component at the scheduled time, but may not schedule the repair and/or maintenance action for the second component at the same scheduled time as the first component responsive to determining that the second expected failure time occurs outside of the window of repair. For example, the control system may determine that it is too early to conduct the repair and/or maintenance actions on the second component, and may schedule the repair and/or maintenance action for a time on the timeline that is closer to the second expected failure time (e.g., at a time outside of the window of repair). Alternatively, the control system may schedule the repair and/or maintenance actions for the first and second components based on the first and the second expected failure times occurring within the window of repair. The repair and/or maintenance actions on the first and second components may be completed at the same scheduled time.

In one or more embodiments, the control system may schedule the repair and/or maintenance events for the first and/or second components based on available assets (e.g., maintenance facility availability, maintenance equipment availability, availability of replacement parts, available manpower, or the like). Optionally, the control system may schedule the repair and/or maintenance of the powered system based on an availability of a replacement component that may replace the current component in the powered system. Optionally, the control system may schedule repair and/or maintenance based on receiving one or more request from an operator of the powered system requesting to repair, maintain, or replace one or more components of the powered system, such as ahead of the scheduled time on the timeline, or at a time after the scheduled time on the timeline, or the like.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In accordance with one or more embodiments or aspects of the subject matter described herein, a method may include receiving sensor data for a component of a powered system, and determining an expected failure time of the component at which the component is expected to fail based at least in part on the sensor data. The expected failure time occurring on a timeline. A window start time may be determined on the timeline that is after a current time but is prior to the expected failure time. The window start time and the expected failure time may define a window time range that extends between the window start time and the expected failure time on the timeline. One or both of a repair action or a maintenance action of the powered system may be scheduled at a scheduled time occurring during the window time range and at a time prior to the expected failure time on the timeline.

Optionally, the window time range may include an upper time limit dictated by the expected failure time and a lower limit dictated by the window start time. Optionally, the expected failure time and the scheduled time of the one or both of the repair action or the maintenance action may be separated by a predetermined length of time. Optionally, the expected failure time may have a determined margin of error. Optionally, one or more characteristics of the component may be determined based on the sensor data. The expected failure time may be based on the one or more characteristics of the component at the window start time of the timeline. Optionally, the sensor data may include thermal sensor data associated with one or more fluids moving within the powered system. Optionally, a command message may be communicated to an operator of the powered system indicating one or more of the expected failure time or the scheduled time of the one or both of the repair action or the maintenance action of the window time range. Optionally, the command message may include a priority level based on a length of time between the expected failure time and the scheduled time. Optionally, the command message may include a high priority level responsive to determining that a length of time between the expected failure time and the scheduled time is less than a determined time range, and the alert may indicate a low priority level responsive to determining that the length of time between the expected failure time and the scheduled time is greater than the determined time range. Optionally, the one or both of the repair action or the maintenance action may be scheduled at the scheduled time based on one or more of one or more operating conditions of the powered system, environmental conditions of the powered system, or one or more operational requirements of the powered system. Optionally, the one or both of the repair action or the maintenance action of the powered system may be completed, and a command message may be communicated indicating the completion of the one or both of the repair action or the maintenance action. Optionally, at least one of a level of degradation or a rate of degradation of the component of the powered system may be determined based at least in part on the sensor data. The one or both of the repair action or the maintenance action of the powered system may be scheduled at the scheduled time based on the at least one of the level of degradation or the rate of degradation of the component and the expected failure time of the powered system. Optionally, the expected failure time may be a first expected failure time of a first component of the powered system. A second expected failure time of a second component of the powered system may be determined. The first and second expected failure times may occur at different times on the timeline. Optionally, it may be determined that the first expected failure time occurs before the second expected failure time on the timeline, and that the second expected failure time occurs within a window of repair on the timeline. The one or more of the repair action or the maintenance action for the first component and the one or more of the repair action or the maintenance action for the second component may be scheduled at the scheduled time that is prior to the first expected failure time on the timeline responsive to determining that the first expected failure time and the second expected failure time occur within the window of repair. Optionally, it may be determined that the first expected failure time occurs before the second expected failure time on the timeline, and that the second expected failure time occurs outside of a window of repair on the timeline. The one or more of the repair action or the maintenance action for the first component may be scheduled at the scheduled time that is prior to the first expected failure time. The one or more of the repair action of the maintenance action for the second component may not be scheduled at the scheduled time responsive to determining that the second expected failure time occurs outside of the window of repair on the timeline.

In accordance with one or more embodiments or aspects of the subject matter described herein, an inspection system may include a controller including one or more processors that may receive sensor data for a component of a powered system. The processors may determine an expected failure time of the component at which the component is expected to fail based at least in part on the sensor data. The expected failure time may occur on a timeline. The controller may determine a window start time on the timeline that is after a current time but is prior to the expected failure time. The window start time and the expected failure time may define a window time range that extends between the window start time and the expected failure time. The controller may schedule one or more of a repair action or a maintenance action of the powered system at a scheduled time occurring during the window time range and prior to the expected failure time on the timeline.

In accordance with one or more embodiments or aspects of the subject matter described herein, a method may include determining an expected failure time on a timeline at which a powered system is expected to fail based at least in part on sensor data of the powered system. The sensor data may be obtained at a window start time of the timeline. The expected failure time may occur subsequently to the window start time. The expected failure time and the window start time defining a window time range of the timeline. One or more of a repair action or a maintenance action of the powered system may be scheduled at a scheduled repair time at a time on the timeline within the window time range. The scheduled repair time may be based on one or more of one or more operating conditions of the powered system, environmental conditions of the powered system, or one or more operational requirements of the powered system.

Optionally, the expected failure time may be a first expected failure time of a first component of the powered system, and a second expected failure time of a second component of the powered system may be determined. The first and second expected failure times may occur at different times on the timeline. Optionally, it may be determined that the first expected failure time occurs before the second expected failure time on the timeline, and the one or more of the repair action of the maintenance action for both the first and second components may be scheduled at the scheduled repair time that is prior to the first expected failure time on the timeline. Optionally, the one or more of the repair action or the maintenance action of both of the first component and the second component may be completed at the scheduled repair time that is prior to the first expected failure time based on the first expected failure time occurring before the second expected failure time on the timeline.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features.

Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   receiving sensor data for a component of a powered system;
   determining a window start time on a timeline, the window start time being after a current time, the window start time determined to allow for the powered system to be operated for a length of time before received sensor data may be used to determine an effectiveness value;
   determining, after the powered system has been operating and receiving sensor data for a period of time, the effectiveness value of the powered system based on a portion of the received sensor data and received before the window start time, the effectiveness value being a numerical value indicative of a performance of at least one of (i) the powered system or (ii) the component of the powered system;
   generating expected sensor data determined from the effectiveness value of the powered system, the expected sensor data being predictive data indicative of the future performance of the powered system, or component of the powered system, starting at least at the window start time;
   comparing the sensor data with the expected sensor data to determine a difference between the sensor data and the expected sensor data;
   determining, prior to a failure event of the powered system, an expected failure time of the component at which the component is expected to fail based at least in part on the difference between the sensor data and the expected sensor data exceeding a threshold margin of change, the expected failure time occurring on the timeline, the window start time and the expected failure time defining a window time range that extends between the window start time and the expected failure time on the timeline;
   scheduling one or both of a repair action or a maintenance action of the powered system at a scheduled time occurring during the window time range and at a time prior to the expected failure time on the timeline; and
   completing one or both of a repair action or the maintenance action of the powered system at the scheduled time during the window time range.

2. The method of claim 1, wherein the window time range includes an upper limit dictated by the expected failure time and a lower limit dictated by the window start time.

3. The method of claim 1, wherein the expected failure time and the scheduled time of the one or both of the repair action or the maintenance action are separated by a predetermined length of time.

4. The method of claim 1, wherein the expected failure time has a determined margin of error.

5. The method of claim 1, further comprising determining one or more characteristics of the component based on the sensor data, wherein the expected failure time is based on the one or more characteristics of the component at the window start time of the timeline.

6. The method of claim 1, wherein the sensor data includes thermal sensor data associated with one or more fluids moving within the powered system.

7. The method of claim 1, further comprising communicating a command message to an operator of the powered system indicating one or more of the expected failure time or the scheduled time of the one or both of the repair action or the maintenance action of the window time range.

8. The method of claim 7, wherein the command message includes a priority level based on a length of time between the expected failure time and the scheduled time.

9. The method of claim 7, wherein the command message indicates a high priority level responsive to determining that a length of time between the expected failure time and the scheduled time of the timeline is less than a determined time range, and the command message indicates a low priority level responsive to determining that the length of time between the expected failure time and the scheduled time of the timeline is greater than the determined time range.

10. The method of claim 1, further comprising scheduling the one or both of the repair action or the maintenance action of the component at the scheduled time based on one or more of one or more operating conditions of the powered system, environmental conditions of the powered system, or one or more operational requirements of the powered system.

11. The method of claim 1, further comprising communicating a command message indicating the completion of the one or both of the repair action or the maintenance action.

12. The method of claim 1, further comprising:
determining at least one of a level of degradation or a rate of degradation of the component of the powered system based at least in part on the sensor data; and
scheduling the one or both of the repair action or the maintenance action of the powered system at the scheduled time based on the at least one of the level of degradation or the rate of degradation of the component and the expected failure time of the powered system.

13. The method of claim 1, wherein the expected failure time is a first expected failure time of a first component of the powered system, and further comprising determining a second expected failure time of a second component of the powered system, the first and second expected failure times occurring at different times on the timeline.

14. The method of claim 13, further comprising:
determining that the first expected failure time occurs before the second expected failure time on the timeline;
determining that the second expected failure time occurs within a window of repair on the timeline; and
scheduling the one or both of the repair action or the maintenance action for the first component and the one or both of the repair action or the maintenance action for the second component at the scheduled time that is prior to the first expected failure time on the timeline responsive to determining that the first expected failure time and the second expected failure time occur within the window of repair.

15. The method of claim 13, further comprising:
determining that the first expected failure time occurs before the second expected failure time on the timeline;
determining that the second expected failure time occurs outside of a window of repair on the timeline; and
scheduling the one or both of the repair action or the maintenance action for the first component at the scheduled time that is prior to the first expected failure, wherein the one or both of the repair action or the maintenance action for the second component is not scheduled at the scheduled time responsive to determining that the second expected failure time occurs outside of the window of repair on the timeline.

16. An inspection system comprising:
a controller including one or more processors configured to receive sensor data for a component of a powered system, the one or more processors configured to determine an effectiveness value of the powered system based on a portion of the sensor data received during a use of the component received before a window start time and after the powered system has been operating for a determined period of time after which the sensor data may be used to determine the effectiveness value, the effectiveness value being a numerical value indicative of a performance of at least one of (i) the powered system or (ii) the component of the powered system, the one or more processors configured to generate expected sensor data based on the determined effectiveness value of the powered system, the expected sensor data being predictive data indicative of the future performance of the powered system or component of the powered system, after the current time, the one or more processors configured to compare the sensor data with the expected sensor data to determine a difference between the sensor data and the expected sensor data, the one or more processors configured to determine an expected failure time of the component at which the component is expected to fail based at least in part on the difference between the sensor data and the expected sensor data exceeding a threshold margin of change, the expected failure time occurring on a timeline,
the controller configured to determine the window start time on the timeline that is after a current time but is prior to the expected failure time, the window start time and the expected failure time defining a window time range that extends between the window start time and the expected failure time on the timeline, the window start time determined to allow for the powered system to be operated for a length of time before received sensor data may be used to determine an effectiveness value, and
the controller configured to schedule one or more of a repair action or a maintenance action of the powered system at a scheduled time occurring during the window time range and prior to the expected failure time on the timeline, and
the controller configured to control a communication system to communicate a command message indicating completion of the one or both of the repair action or the maintenance action.

17. A method comprising:
determining a window start time on a timeline, the window start time being after a current time, the window start time determined to allow for the powered system to be operated for a length of time before received sensor data may be used to determine an effectiveness value;
determining, after the powered system has been operating and receiving sensor data for a period of time, the effectiveness value of the powered system based on a portion of the received sensor data measured during a period of one or more days and received before the window start time, the effectiveness value being a numerical value indicative of a performance of at least one of (i) the powered system or (ii) the component of the powered system;
comparing sensor data of a powered system with expected sensor data of the powered system to determine a difference between the sensor data and the expected sensor data, the expected sensor data is based on the determined effectiveness value, and the expected sensor data being predictive data indicative of the future performance of the powered system, or component of the powered system starting at least at the window start time;
determining, prior to a failure event of the powered system, an expected failure time on a timeline at which a powered system is expected to fail based at least in part on the difference between the sensor data of the powered system and the expected sensor data of the powered system exceeding a threshold margin of change, the sensor data obtained at the window start time of the timeline, the expected failure time occurring subsequently to the window start time, the expected failure time and the window start time defining a window time range of the timeline; and
scheduling one or more of a repair action or a maintenance action of the powered system at a scheduled repair time at a time on the timeline within the window time range and prior to the expected failure time on the timeline, the scheduled repair time based on one or more of one or more operating conditions of the powered system, environmental conditions of the powered system, or one or more operational requirements of the powered system.

18. The method of claim 17, wherein the expected failure time is a first expected failure time of a first component of the powered system, and further comprising determining a second expected failure time of a second component of the powered system, the first and second expected failure times occurring at different times on the timeline.

19. The method of claim 18, further comprising:
determining that the first expected failure time occurs before the second expected failure time on the timeline; and
scheduling the one or more of the repair action or the maintenance action for both of the first component and the second component at the scheduled repair time that is prior to the first expected failure time on the timeline.

20. The method of claim 19, further comprising completing the one or more of the repair action or the maintenance action of both of the first component and the second component at the scheduled repair time that is prior to the first expected failure time based on the first expected failure time occurring before the second expected failure time on the timeline.

21. The method of claim 1, wherein the window start time is determined based on a change in the effectiveness value over time.

22. The method of claim 1, wherein determining the expected failure time is performed at or before the window start time.

* * * * *